US008238987B2

(12) United States Patent
De Vos et al.

(10) Patent No.: US 8,238,987 B2
(45) Date of Patent: Aug. 7, 2012

(54) RETRACTABLE ANTENNA STRUCTURE FOR USE IN TELECOMMUNICATIONS DEVICE

(75) Inventors: Chris De Vos, Wemmel (BE); Thomas Stevens, Schaarbeek (BE); Jan Wijnen, Hasselt (BE)

(73) Assignee: Option, Leuven (BE)

( * ) Notice: Subject to any disclaimer, the term of this patent is extended or adjusted under 35 U.S.C. 154(b) by 837 days.

(21) Appl. No.: 11/816,673

(22) PCT Filed: Feb. 17, 2006

(86) PCT No.: PCT/EP2006/060080
§ 371 (c)(1), (2), (4) Date: Nov. 18, 2008

(87) PCT Pub. No.: WO2006/087384
PCT Pub. Date: Aug. 24, 2006

(65) Prior Publication Data

US 2009/0143119 A1 Jun. 4, 2009

(30) Foreign Application Priority Data

Feb. 18, 2005 (EP) ................................. 05447036.4

(51) Int. Cl.
*H04M 1/00* (2006.01)

(52) U.S. Cl. .................................................. 455/575.7

(58) Field of Classification Search ................ 455/575.7
See application file for complete search history.

(56) References Cited

U.S. PATENT DOCUMENTS

| | | | | |
|---|---|---|---|---|
| 5,949,379 | A * | 9/1999 | Yang | 343/702 |
| 6,031,503 | A * | 2/2000 | Preiss et al. | 343/770 |
| 6,075,500 | A * | 6/2000 | Kurz et al. | 343/895 |
| 6,259,418 | B1 | 7/2001 | Jones et al. | |
| 6,556,170 | B2 * | 4/2003 | Northey | 343/700 MS |
| 2001/0036757 | A1 * | 11/2001 | Jones et al. | 439/135 |
| 2002/0022460 | A1 | 2/2002 | Lintern et al. | |
| 2002/0163472 | A1 | 11/2002 | Kasuya et al. | |
| 2003/0210199 | A1 * | 11/2003 | Sward et al. | 343/795 |
| 2004/0263398 | A1 | 12/2004 | Cheng | |
| 2006/0079277 | A1 * | 4/2006 | Ditzik | 455/556.1 |

* cited by examiner

*Primary Examiner* — Nathan Mitchell
(74) *Attorney, Agent, or Firm* — Browdy and Neimark, PLLC

(57) ABSTRACT

The invention relates to a retractable antenna structure for use in a telecommunications device. The antenna structure comprising a slide portion adapted for movably mounting the antenna structure in a cavity of a telecommunications device, such that the antenna structure is retractable into the cavity for storage and extensible from the cavity for operation, and an antenna portion carrying a flat radiation element for establishing at least one wireless network connection. The antenna portion comprises a first wing carrying a first part of the radiation element and a second wing carrying a second part of the radiation element. The wings are pivotally connected to each other between a storage position in which the wings lie on top of each other and an operational position in which the wings are spaced apart. The antenna portion further comprises at least one resilient member acting on at least one of the wings for spacing the wings apart. The invention further relates to a telecommunications device equipped with the antenna structure, such as a PCMCIA telecommunications card or a laptop computer.

17 Claims, 6 Drawing Sheets

RETRACTABLE ANTENNA STRUCTURE FOR USE IN TELECOMMUNICATIONS DEVICE

TECHNICAL FIELD

The present invention relates to a retractable antenna structure for use in a telecommunications device according to the preamble of the first claim. The invention further relates to telecommunications devices, such as for example a telecommunications card or a laptop computer, equipped with such a retractable antenna structure.

BACKGROUND ART

Retractable antenna structures for use in telecommunications devices are for example known from publications of previous patent applications of the applicant, namely EP-A-1523061 and EP-A-1174945. Both publications relate to PCMCIA telecommunications cards for establishing wireless communication between a host device and one or more wireless networks. To this end, the cards are equipped with retractable antenna structures which can be stored in a cavity of the card for transportation and extended from the cavity during use.

The retractable antenna structures known from EP-A-1523061 and EP-A-1174945 however have the disadvantage that operation can be unreliable in given circumstances.

DISCLOSURE OF THE INVENTION

It is an aim of the present invention to provide a retractable antenna structure for use in telecommunications devices which can operate more reliably in nearly all circumstances.

This aim is achieved according to the invention with a retractable antenna structure showing the technical characteristics of the first claim.

The retractable antenna structure according to the invention comprises a slide portion adapted for movably mounting the antenna structure in a cavity of a telecommunications device, such that the antenna structure is retractable into the cavity for storage and extensible from the cavity for operation, and an antenna portion carrying a flat radiation element for establishing at least one wireless network connection. The antenna portion comprises a first wing carrying a first part of the radiation element and a second wing carrying a second part of the radiation element, the wings being pivotally connected to each other between a storage position in which the wings lie on top of each other and an operational position in which the wings are spaced apart. The antenna portion further comprises at least one resilient member acting on at least one of the wings for spacing the wings apart. This resilient member makes sure that the wings are immediately spaced apart upon movement from the storage to the operational position and manual intervention by the user is avoided.

An analysis of the problem of the prior art antenna structures has shown that the reliability is affected because the antenna is in each case a quarter-wave antenna (monopole, helical, meander line) which uses the telecommunications card from which it forms part and the host device (e.g. laptop) in which the telecommunications card is inserted as an active virtual ground plane. The telecommunications card together with the host device is the so-called counterpoise being used as an imperfect substitute for earth in an antenna system. The reliability is affected by the counterpoise current, which causes interference between the antenna and the host device and the fact that the counterpoise current makes the antenna properties sensitive to any changes of the size, shape and position of the host device. As a result, the bandwidth of the wireless network connection becomes very dependent on the counterpoise, and is therefore difficult to control.

The antenna structure of the invention can be considered as a “dipole-like” antenna, one wing of the antenna portion forming the radiating antenna plane of the dipole while the other forms the artificial ground plane of the dipole. In operation, the artificial ground plane functions as the counterpoise and this function no longer has to be fulfilled by the telecommunications device to which the antenna structure is connected. As a result, the counterpoise is less variable in size, shape and position and the interference between the antenna and the host device is reduced, so that reliability can be strongly enhanced.

By dividing the dipole-like antenna over the two wings which can be placed on top of each other for storage the overall size of the antenna structure of the invention can be very small while the bandwidth and radiation properties remain excellent.

In a preferred embodiment of the antenna structure of the invention, in the operational position the first and second wings are not coplanar, meaning that the antenna structure is not a regular dipole antenna. Preferably, in the operational position the second wing is substantially coplanar with the slide portion while the first wing is erected with respect to the second wing to an angle between 30° and 85°, more preferably between 60° and 80°, optimally about 70°. In this embodiment, the radiation patterns of the parts of flat radiation element are adapted for obtaining a dipole-like operation at the angle at which the wings are spaced apart. The RF performance and especially the bandwidth of a regular dipole antenna is largely defined by the separation—the term used for the distance between the driven-element and the counterpoise—the patterns used, and the thickness of stubs in both planes. By adapting the shapes of the radiation patterns to obtain the dipole-like operation at an angle which is not 180°, the desired bandwidths can be achieved without having to fully “open” the antenna. Thus, a more compact construction can be achieved, especially at separation angles of less than 90°. However, separation angles of 180° and more are also possible within the scope of the invention, although they are not preferred.

Preferably, the first and second parts of the flat radiation element are each formed by a conductive pattern on a thin film. The two parts can be carried out on a single thin film which is “folded up” in the antenna portion or as two separate parts of thin film. The use of thin film has the advantage that the radiation element has a very small thickness so that the antenna portion takes up only a limited amount of space. The flat radiation element may however also be formed by a conductive pattern on a plastic circuit board (PCB), or any other flat radiation element known to the person skilled in the art.

Preferably, the slide portion of the antenna structure of the invention is provided with one or more resilient contacts in electrical communication with the first and/or second parts of the flat radiation element for contacting a corresponding contact on the telecommunications device. The resiliency of the contact can ensure that currents can be conducted between the electronics of the telecommunications device and the flat radiation element of the antenna structure. The first and second parts of the flat radiation element are preferably electrically isolated from each other and are provided with their own resilient contact for contacting a corresponding contact on the telecommunications device.

According to the invention, one or both wings of the antenna portion may be movably connected to the slide portion and one or both may be moved upon spacing them apart. Preferably, the first and second wings of the antenna portion are both pivotally connected to the slide portion along a common pivot axis with the second wing preferably being movable in downwards direction against the action of a resilient member. It is understood that "downwards" is opposite the direction in which the first wing is erected when moving from the storage to the operational position. This can ensure that, in the event the user accidentally hits the second wing, it is not broken off but merely pushed aside, after which it is returned to its original position by the resilient member. This resilient member acting on the second wing is preferably the same as the one which acts on the first wing, but it can also be a separate resilient member. The resilient member is advantageously a torsion spring which is mounted on the common pivot axis, but it can also be any other resilient member known to the person skilled in the art.

Preferably, the retractable antenna structure according to the invention is adapted to be releasably mounted into the cavity of the telecommunications device. This is preferably achieved by providing the slide portion with a snap-fitting locking member for releasably locking the antenna structure to a corresponding locking member provided within the cavity of the telecommunications device. The releasable mounting has the advantage that the antenna structure can be replaced in the event of malfunction or breakage or interchanged with other antenna structures which are for example intended for other wireless networks.

The telecommunications device of the invention comprises a cavity and a retractable antenna structure as described above which is movably mounted in the cavity, such that the antenna structure is retractable into the cavity for storage and extensible from the cavity for operation.

In a preferred embodiment, the telecommunications device is equipped with the above described embodiment of the retractable antenna structure which is provided with the snap-fitting locking member. In this embodiment, the locking member is accessible to the user through an opening in the housing of the device for releasing the antenna structure.

In one embodiment, the telecommunications device is a PCMCIA telecommunications card for establishing wireless communication between a host device, to which the PCMCIA telecommunications card is connectable, and one or more wireless networks.

In another embodiment, the telecommunications device is a laptop computer. In this embodiment, the laptop computer preferably comprises—as is common for laptop computers—a computer part and a display part which are hingedly attached to each other, the cavity with the retractable antenna structure being located on the display part.

The antenna structure of the invention may further be applied in any other telecommunications devices known to the person skilled in the art. Each new wireless design that is in a need of an antenna, whether at a large or at a rather small bandwidth, may find this invention very useful and efficient in terms of size, performance and price. It offers an alternative to other proposed antenna concepts and architectures.

BRIEF DESCRIPTION OF THE DRAWINGS

The invention will be further elucidated by means of the following description and the appended figures.

MODES FOR CARRYING OUT THE INVENTION

Figure 1:
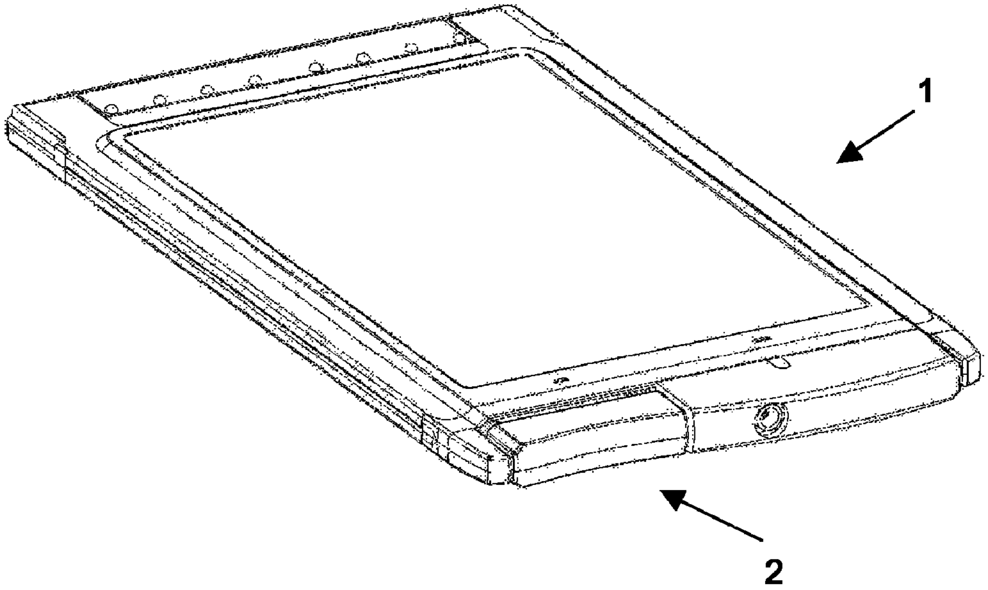
FIG. 1 shows a perspective view of a telecommunications card equipped with a retractable antenna structure according to the invention, with the antenna structure in the storage position.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 2:
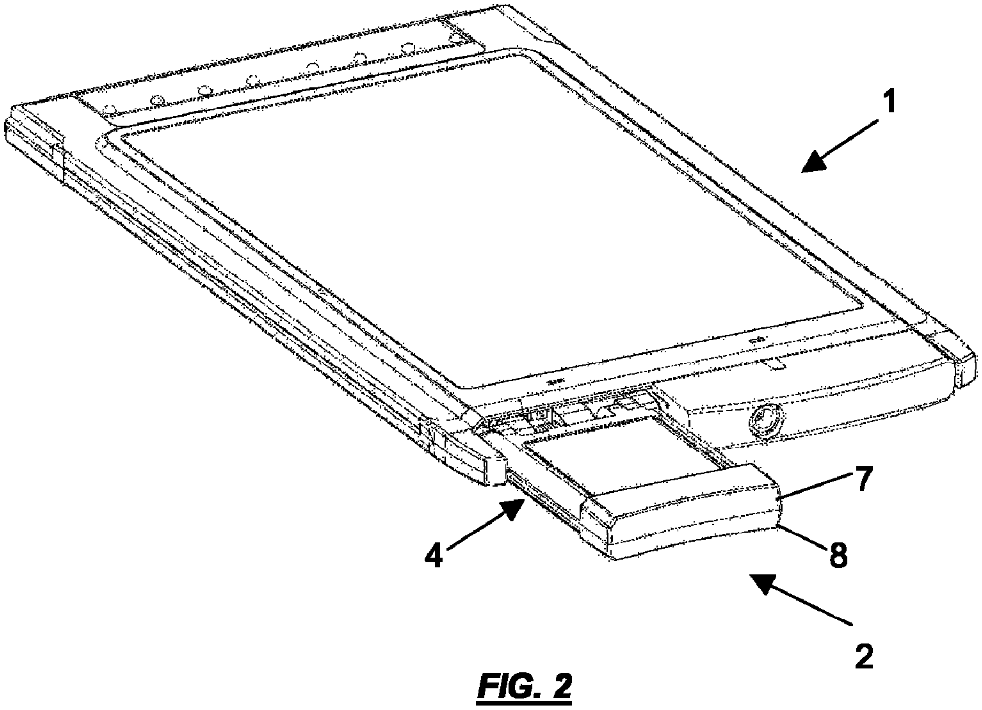
FIG. 2 shows a perspective view of the telecommunications card of FIG. 1, with the antenna structure in an intermediate position.
Figure 3:
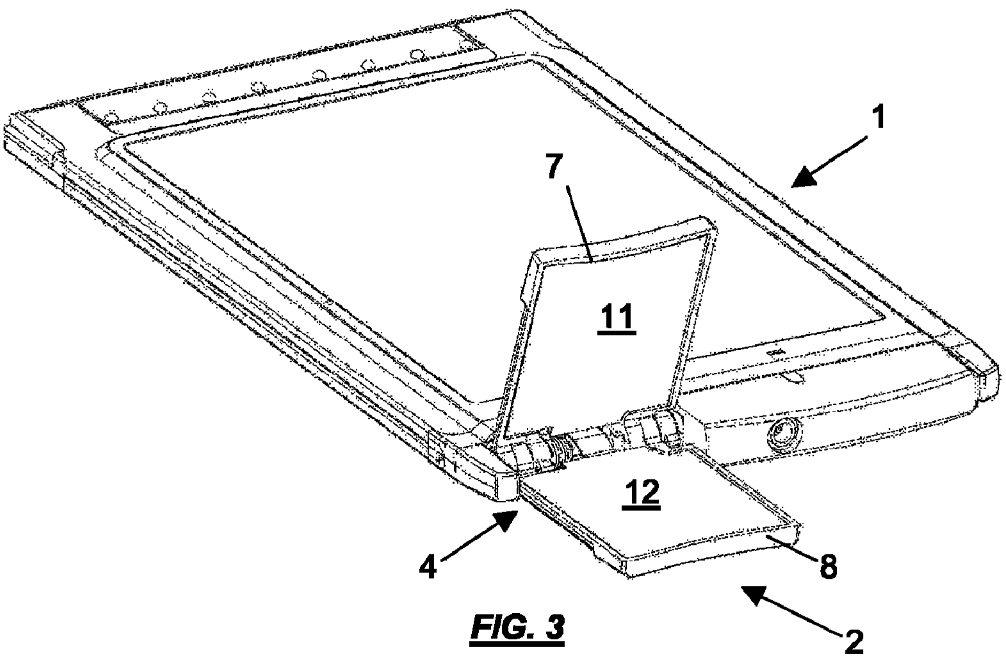
FIG. 3 shows a perspective view of the telecommunications card of FIG. 1, with the antenna structure in the operational position.

The telecommunications device 1 of FIGS. 1-3 is equipped with a retractable antenna structure 2 according to the invention. The telecommunications device 1 is a type 11 PCMCIA telecommunications card for wireless communication between a host device (not shown) and a GSM/GPRS/EG-PRS/UMTS network, such as has been described in the other patent publications EP-A-1523061 and EP-A-1174945 in the name of the applicant, which are hereby incorporated by reference in their entirety. The other components of the card 1 and its operation are extensively discussed in these patent publications and will therefore not be described here.

The antenna structure 2 comprises a slide portion 3 adapted for movably mounting the antenna structure 2 in a cavity of a telecommunications device 1, such that the antenna structure is retractable into the cavity for storage as shown in FIG. 1 and extensible from the cavity for operation as shown in FIG. 3. FIG. 2 shows the antenna structure in an intermediate position, on its way from the storage position of FIG. 1 to the operational position of FIG. 3. The antenna structure 2 further comprises an antenna portion 4 which carries a flat radiation element 5, 6 for establishing wireless connections with a number of wireless networks. The antenna portion 4 comprises a first wing, hereafter called the upper wing 7, which carries a first part 5 of the radiation element and a second wing, hereafter called the lower wing 8, which carries a second part 6 of the radiation element. The first and second parts 5, 6 of the flat radiation element are fastened to the wings by glueing, but any other way of fastening known to the skilled person is of course also possible. The wings 7, 8 are pivotally connected to each other and to the slide portion 4 along a common pivot axis 9. In this way, the wings 7, 8 are movable between a storage position in which the wings lie on top of each other, as shown in FIGS. 1 and 2, and an operational position in which the wings are spaced apart, as shown in FIG. 3. The antenna portion 4 further comprises a torsion spring 10 mounted on the pivot axis 9, which forms a resilient member acting on the upper wing 7 for spacing the wings apart. This torsion spring 10 makes sure that the wings 7, 8 are immediately spaced apart upon movement from the storage to the operational position and that manual intervention by the user is avoided.

For extending the antenna structure 2 to the operational position, the frontal outwardly accessible edge of the antenna structure 2 is pushed inwards by the user, which unlocks a retaining mechanism (not shown) in the interior of the telecommunications device 1. An ejection mechanism (not shown) then pushes the antenna structure 2 to the operational position. For storing the antenna structure 2 the user pushes the upper wing onto the lower wing 8 and then pushes the antenna structure 2 back into the cavity until the retaining mechanism is again engaged. In the retracted position the antenna is prevented from operating. As shown in FIG. 1, in storage position the frontal edge of the antenna structure 2 is flush with the small plastic extension of the PCMCIA PC Card Form Factor II.

Figure 8:
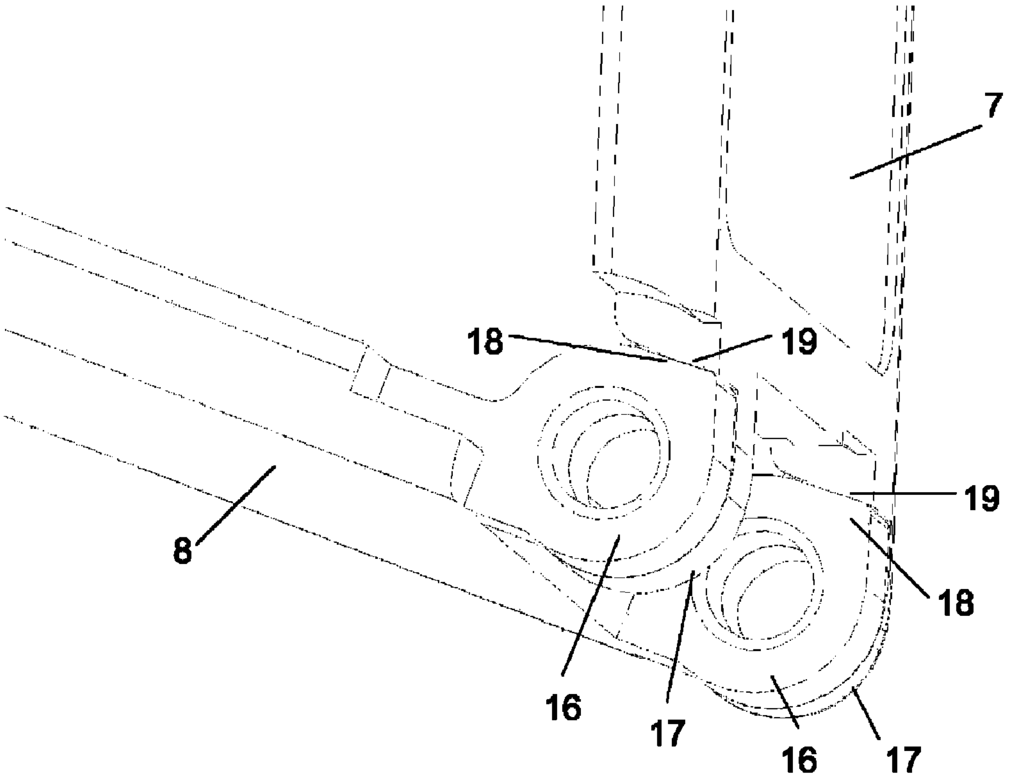
FIG. 8 shows a perspective side view of the upper and lower wings of the antenna structure of FIGS. 1-3.
Figure 9:
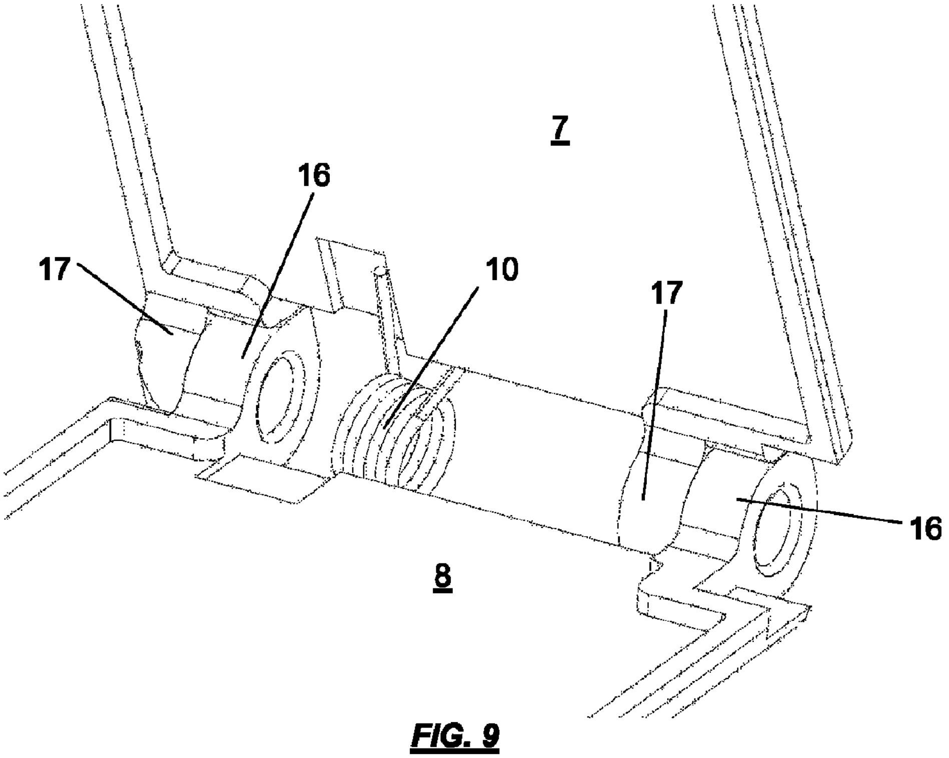
FIG. 9 shows a perspective front view of the upper and lower wings of the antenna structure of FIGS. 1-3.

As shown in FIGS. 3, 8 and 9, the two wings 7, 8 are spaced apart about 70° in the operational position. The radiation patterns of the parts 5, 6 of the flat radiation element are adapted for obtaining a dipole-like operation at this angle, which will be described in detail below. In order to obtain a high reliability, the rotation angle of the antenna at full open position is kept within a 1° degree resolution. It is clear that other angles of separation may be chosen by the skilled person, depending on the circumstances.

In FIG. 3, the parts 5, 6 of the radiation pattern are not visible since they are covered by cover elements 11, 12. These can for example be formed by adhesive labels on which a logo or a trademark is printed. This shows another advantage of the double-winged construction of the antenna structure 2: more space for advertising.

Figure 4:
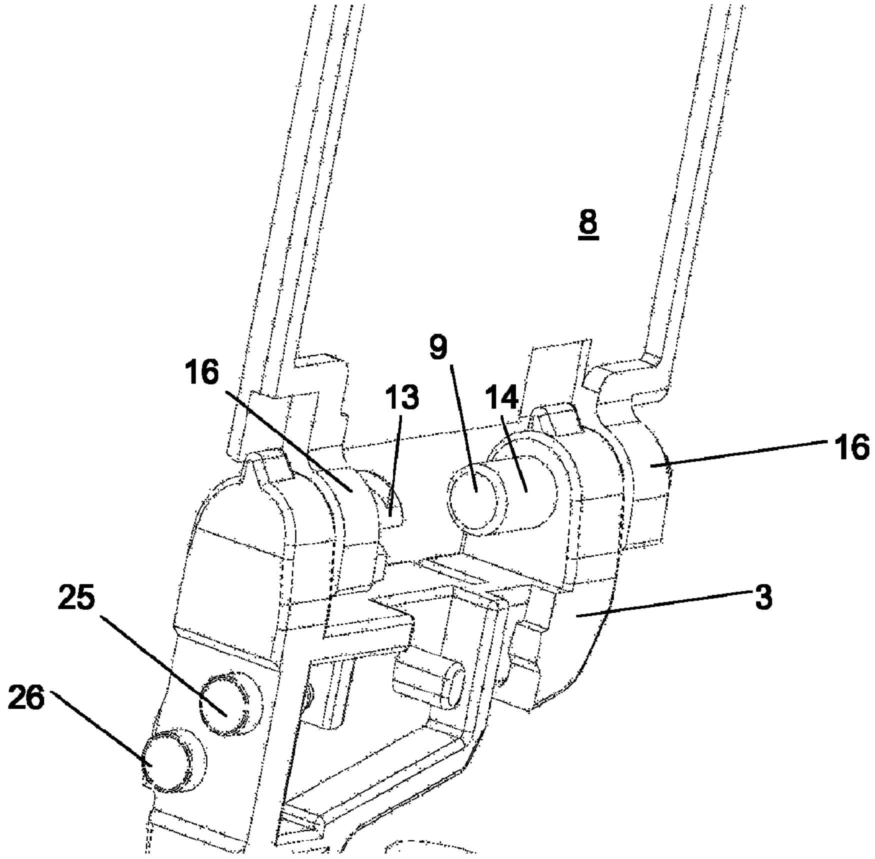
FIG. 4 shows a perspective top view of the slide portion and the lower wing of the antenna structure of FIGS. 1-3.
Figure 5:
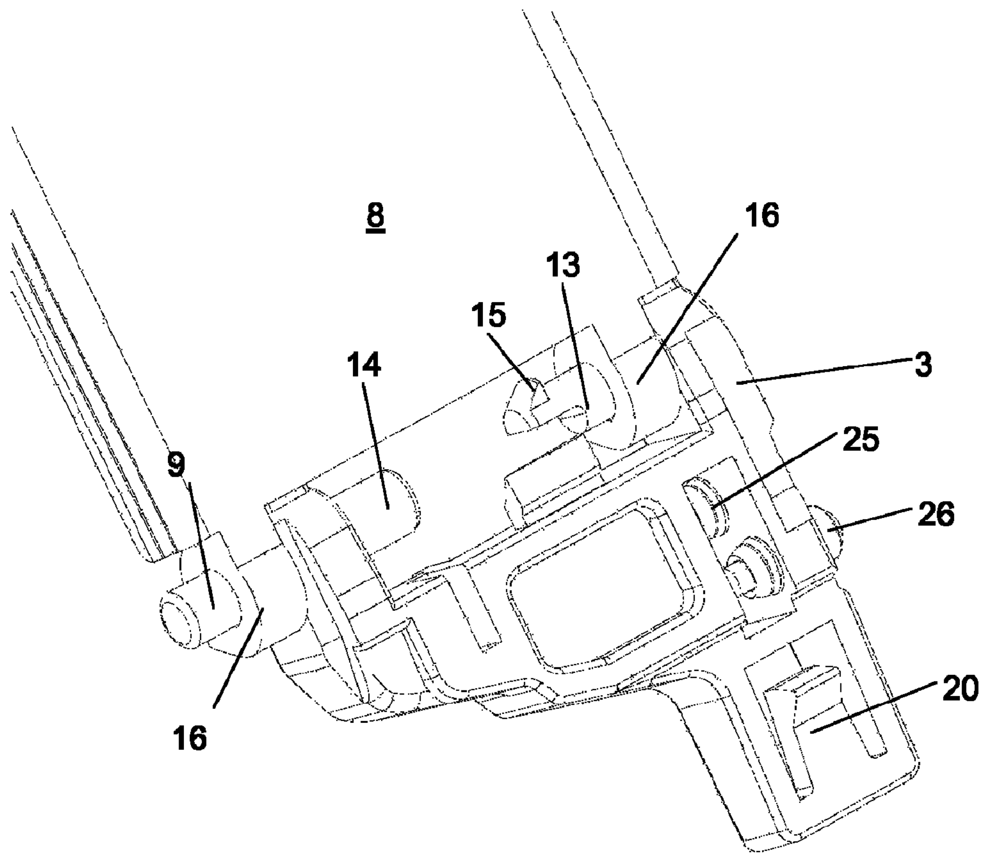
FIG. 5 shows a perspective bottom view of the slide portion and the lower wing of the antenna structure of FIG. 1-3.

In the top and bottom views of FIGS. 4 and 5 it is shown how the lower wing 7 is pivotally connected to the slide portion 3 on the pivot axis 9, which is also the pivot axis on which the upper wing 8 is connected to the slide portion 3. The upper wing 8 is removed in the FIGS. 4 and 5 for the purposes of clarity. The hinge axis 9 comprises two pens 13 and 14, which form part of the slide portion 3. In assembled state, both pens 13, 14 extend through pivot parts 16, 17 which form part of the wings 7, 8 (see also FIG. 8). The pen 13 is provided with a resiliently compressible end 15 with a retaining edge over which the pivot parts 16, 17 are slid upon assemblage in a snap-fitting way. The pen 14 also holds the torsion spring 10.

The connection between the lower wing 8 and the slide portion 3 is such, that the lower wing 8 is movable in downwards direction, "downwards" meaning the opposite direction to the one in which the upper wing 7 is erected when moving from the storage to the operational position. As shown in FIG. 8, the pivot parts 16 of the lower wing 8 have outwardly protruding edges 18 which abut corresponding edges 19 on the upper wing 19. These edges 18, 19 one the one hand limit the separation angle between the wings 7, 8 to 70° and on the other hand couple the wings 7, 8 in such a way that when the lower wing 8 is pushed downwards, the upper wing 8 is moved along with it against the action of the torsion spring 10. As a result, when the lower wing 8 is released, both wings are automatically moved back to the operational position. This can ensure that, in the event the user accidentally hits the lower wing 8, it is not broken off but merely pushed aside, after which it is returned to its original position by the torsion spring. Any other cooperating mechanical parts known to the person skilled in the art may also be provided on the two wings 7, 8 in order to ensure their correct separation angle in the operating position.

Figure 7:
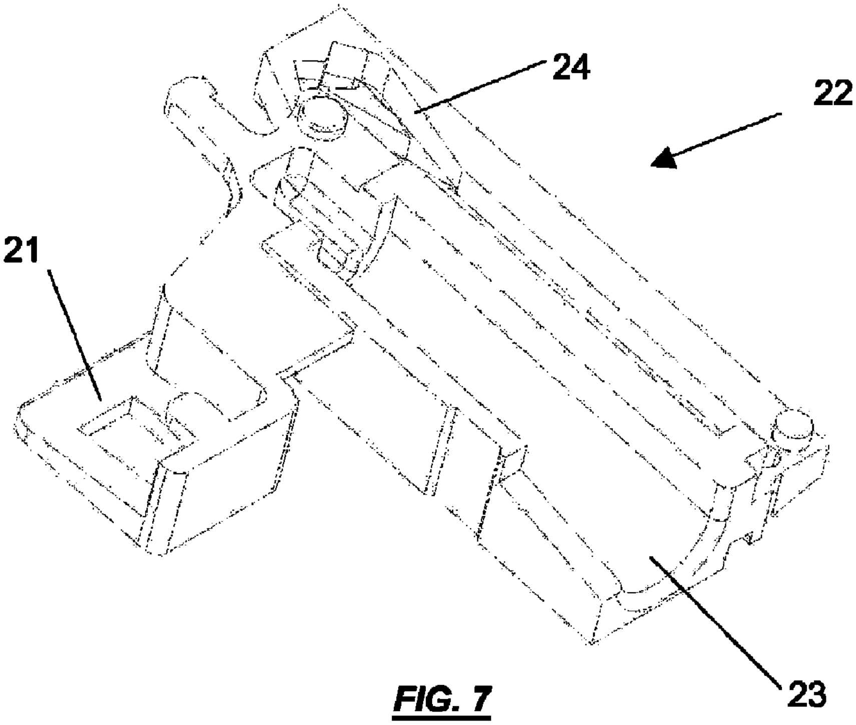
FIG. 7 shows an embodiment of an additional slide portion in the telecommunications device of FIGS. 1-3, adapted to mate with the slide portion of the antenna structure.

The retractable antenna structure 2 is adapted to be releasably mounted into the cavity of the telecommunications device 1 by means of a snap-fitting locking member 20 (see FIG. 5) on the slide portion 3. This snap-fitting locking member 20 is complementary to a corresponding locking member 21 (see FIG. 7) which is provided on an additional slide portion 22 which is provided within the cavity of the telecommunications device 1. The releasable mounting has the advantage that the antenna structure 2 can be replaced in the event of malfunction or breakage or interchanged with other antenna structures which are for example intended for other wireless networks. On the back of the telecommunications device 1 a dismounting hole (not shown) is provided in order to access the snap-fitting locking member 20.

The additional slide portion 22 is part of the telecommunications device 1 and has a recess 23 in which a push-spring (not shown) is placed. This spring forms the ejection mechanism for moving the antenna structure 2 to the operational position. The additional slide portion 22 further shows a track 24 in which the end of a retaining pin (not shown) runs upon cycling between the storage end operation positions. This retaining pin and track 24 form the retaining mechanism which holds the antenna structure 2 in the storage position when not in use. These parts have been extensively discussed in the above mentioned previous patent publications of the applicant, incorporated herein by reference in their entirety, and will therefore not be discussed in detail here.

The electrical contact between the antenna structure 2 and the telecommunications device is carried out as follows. The parts 5, 6 of the radiation element enter into contact with the PCB of the telecommunications device 1 via two resilient sliding contacts 25, 26. These contacts 25, 26 connect with the PCB via 2 gold plated metal parts (not shown) soldered to the PCB. For example, the contacts allow a play of at least 0.6 mm in their working direction, and a play of +/−1 mm in the axial direction of the ejection mechanism.

Figure 6:
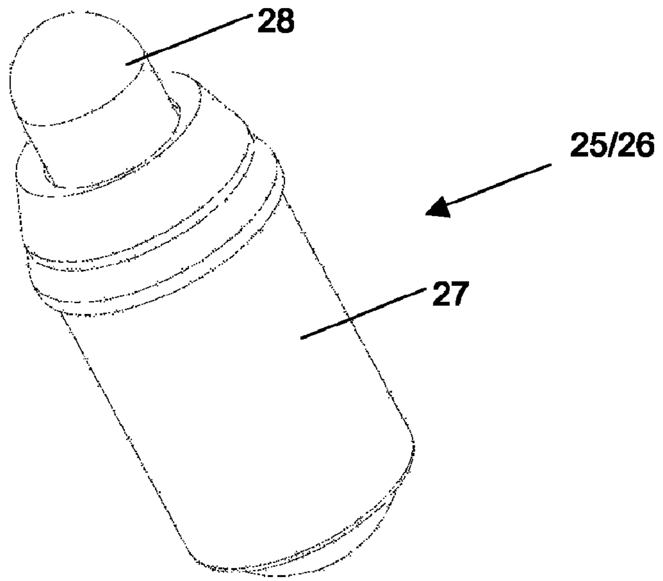
FIG. 6 shows a detail of the resilient contact for establishing electrical communication between the antenna structure and the telecommunications device.

The contacts 25, 26 are so-called "pogo pins" and are shown in detail in FIG. 6. They comprise a housing 27 with a resiliently depressible plunger 28 with a spherical contact surface at both ends and a coil spring inside. When a pogo pin is compressed in the direction of its axis, it exerts an opposite force that pushes its parts away from each other. In view of good operation in the long term it is advantageous that both contacts ends are spherical. As one of the two spherical surfaces of the pogo pin will brush against the sliding contact of the PCB of the telecommunications device 1, it is preferred not to use the plunger 28, as it is more sensitive to damage, but the housing 27. This is why, as shown in the figures, the pogo pins are mounted in the holes with their plungers directed inwards.

Figure 10:
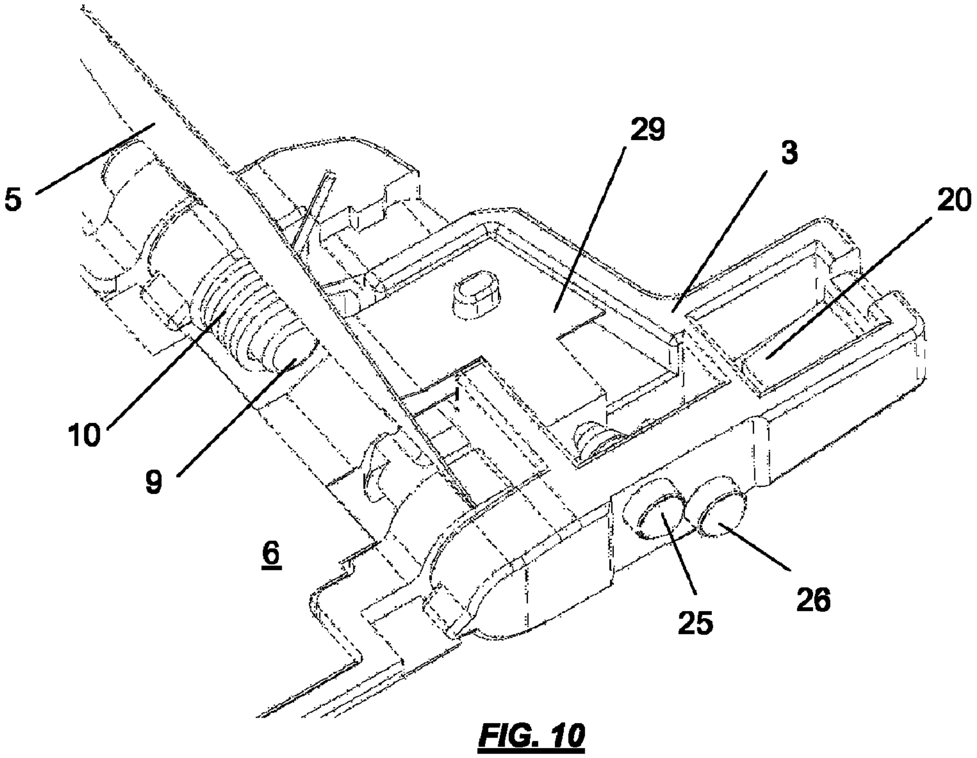
FIG. 10 shows a detail of the antenna structure of FIGS. 1-3.

As shown in FIG. 10, both parts 5, 6 of the flat radiation element have extensions for electrically contacting the pogo pins 25, 26. The two pogo pins 25, 26 are made to move freely in the holes in the slide portion 3 in which they are mounted. The tolerance of the hole when using the ANSI Basic-Hole System is a "sliding fit" (belongs to Class 'Clearance Fit'): sliding fit where parts are not intended to run freely, but must move and turn freely and locate accurately. (Also see ISO 286-1, page 229). It is the housing 27 of the pogo pin that is to fit the hole. In use, occurring radial forces will be absorbed by the hole inner surface. Thus, the pogo pins 25, 26 establish the electrical connection while at the same time ensuring a reliable electrical connection as a result of the sliding fit and the spring force exercised.

In order to understand the operation of the antenna structure 2 according to the invention, one can compare with two types of known antennas: current PCMCIA GSM/GPRS/EDGE antennas and current PCMCIA UMTS antennas.

The current PCMCIA GSM/GPRS/EDGE antennas are so-called quarter-wave antennas (monopole, helical, meander line) which use the PC Card plus the laptop as an active virtual ground plane, which is the so-called counterpoise being used as an imperfect substitute for earth in an antenna system. The overall size of these antennas can be very small and the bandwidth and radiation properties are quite good, but the counterpoise current that is present causes interference between the antenna and the laptop (which is the host device). Moreover the counterpoise current makes the antenna properties sensitive to any changes of the laptop size, shape and position, so that the bandwidth is very dependent on the counterpoise, and therefore difficult to control.

The current PCMCIA UMTS antennas need a PC Card extension to include the PIFA antenna radome. For planar antennas the reactive nearfield is concentrated in the cavity between the radiator and the groundplane. For these antennas, the counterpoise current on the laptop is lower than for the quarter-wave antenna. The interference between antenna and laptop can be minimised by optimising the position of the antenna feedpoints and the bandwidth is easier to control, since the counterpoise has less influence. However, the volume required to have a good antenna is quite big.

Other existing state of the art shows that the radiating conductor element of a classic dipole antenna should be in the same 2D plane as the ground plane for best performance. Ideally it works by "mirroring" the antenna configuration with another set, identical in antenna count, antenna type, horizontal position, pointing direction, antenna configuration, and antenna gain but with each mirror antenna possessing a phase 180° offset from its original.

The underlying theory of the invention, as applied in the antenna structure of FIGS. 1-3, is as follows.

The ground to some extent affects all antennas that are close to the ground. The most noticeable effect is that the ground forces the antenna's radiation pattern to appear in the half-space above the ground. This is illustrated by comparing the radiation around a monopole fed against ground to that of a dipole in free-space. The operating principle of a monopole (or rod antenna in the field) is based on the fact that on a vertical antenna of only a quarter wavelength the same current distribution is obtained as on a half-wave dipole, if the length of the antenna that would be required to give a complete half-wave dipole is "made up for" by a highly conductive plate. As a result of this mirroring effect the vertical quarter-wave antennas installed on conductive ground have the same radiation pattern as dipole antennas. There is of course no radiation into the shielded half-space. The dielectric constant and conductivity of the ground determines how well the ground acts as a conductor and hence a reflector.

A less noticeable effect is that the ground absorbs energy from the antenna. This energy is wasted in the ground's intrinsic resistance. The placement of an artificial ground, or counterpoise, can decrease the ground losses and enhance the performance of an antenna. The input impedance of this antenna architecture is halved compared to that of a dipole. For example, the values can be between 30Ω and 40Ω; the directivity factor can increase to 5.1 dB.

Whereas most external antennas for laptop applications are based on a quarter-wave concept, the antenna structure 2 of the figures can be considered as a "dipole-like" antenna. In operation, the upper wing 7 of the antenna portion 4 forms the radiating antenna plane of the dipole while the lower wing 8 forms the artificial ground plane of the dipole, which functions as the counterpoise. As a result, the counterpoise function no longer has to be fulfilled by the telecommunications device 1 to which the antenna structure 2 is connected. This reduces the dependency of the operation of the antenna structure on the size, shape and position of its host device and the interference between the antenna structure and its host device, so that reliability can be strongly enhanced. Furthermore, by dividing the dipole-like antenna over the two wings 7, 8 which can be placed on top of each other for storage the overall size of the antenna structure 2 can be very small while the bandwidth and radiation properties remain excellent.

The RF performance and especially the bandwidth of a regular dipole antenna is largely defined by the separation—the term used for the distance between the driven-element and the counterpoise—the patterns used, and the thickness of stubs in both planes. By adapting the shapes of the radiation patterns to obtain the dipole-like operation at an angle which is not 180°, the desired bandwidths can be achieved without having to fully "open" the antenna. Thus, a more compact construction can be achieved, especially with a separation angle of less than 90° as is the case here.

Figure 11:
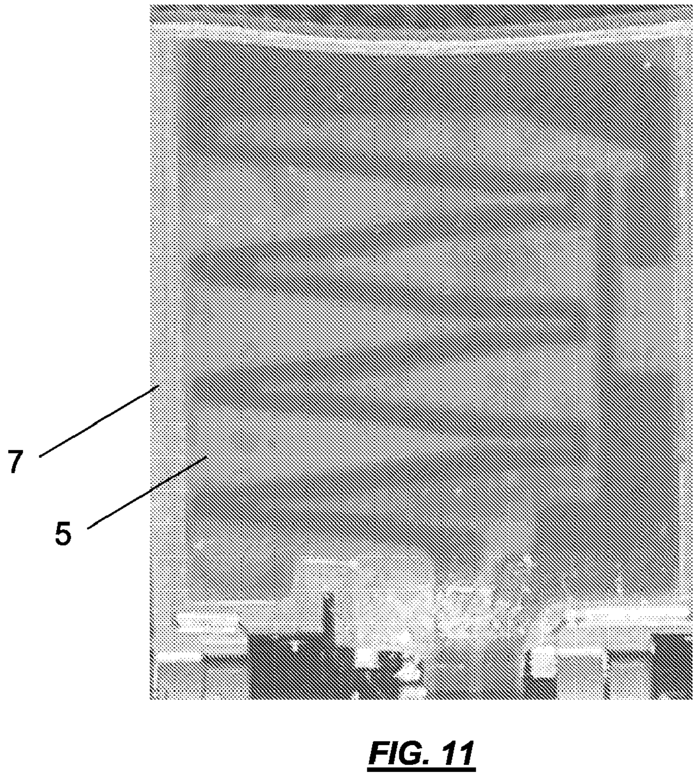
FIG. 11 shows a photograph of the radiation pattern in the upper wing of an antenna structure according to the invention.
Figure 12:
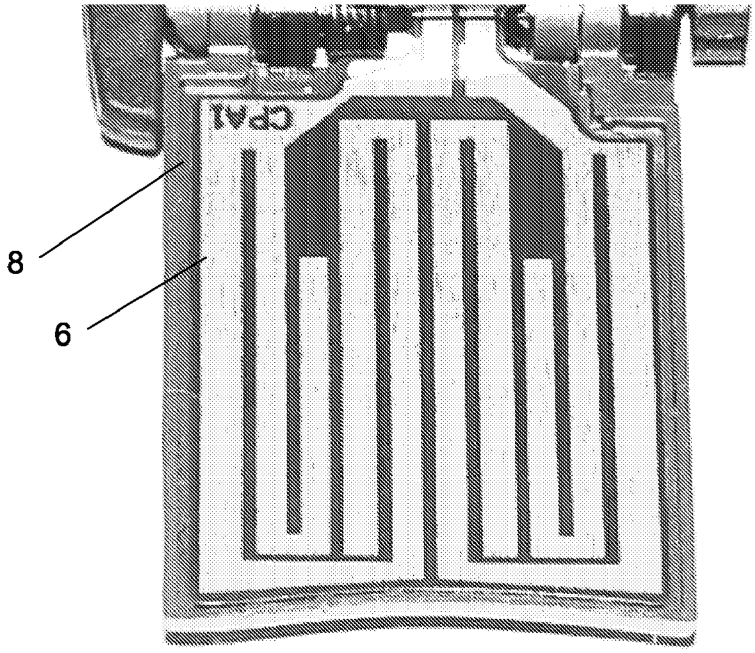
FIG. 12 shows a photograph of the radiation pattern in the lower wing of an antenna structure according to the invention.

The resulting radiation element is for example as shown in the photographs of FIGS. 11 and 12. It is to be noted that in FIG. 11, the darker areas indicate the conductive material, whereas in FIG. 12 the lighter areas indicate the conductive material. This is caused by the fact that the conductive patterns are applied on thin films and that the film of the upper wing 7 was photographed from its bottom side while the thin film of the lower wing 8 was photographed from its top side.

The upper wing 7 carries the first part 5 of the flat radiation element which has a radiation pattern with different components adapted for radiating at the desired different frequencies of the wireless networks. The lower wing 8 carries the second part 6 of the flat radiation element which has a conductive pattern with spiraling portions for creating counterpoise currents.

The radiation element 5, 6 has the following specifications. The radiation element is omni-directional, but the direction of maximal radiation is away from the terminal and its user in front. The components of the radiation patterns are tuned for the following frequency bands: GSM850 (824-894 MHz), EGSM900 (880-960 MHz), DCS1800 (1710-1880 MHz), PCS1900 (1850-1990 MHz), UMTS2100 (1920-2170 MHz). The desired bandwidth especially at 850 Hz is obtained by making the width of the stubs bigger: the max bandwidth is reached when the width is a fifth (⅕) of the length of the stub. In alternative embodiments, the radiation pattern may have different components for different and/or additional frequency bands. The first part 5 of the radiation element comprises 2 stubs, one in the frequency range 850/900 MHz and the other covers the DCS up to 2170 MHz. The resulting feed-point impedance is 30Ω. On the PCB of the telecommunications device matching circuitry (not shown) is provided for matching the antenna to the nominal impedance of commercial power amplifiers.

With these specifications, the following performance is obtained: an average gain over the Cellular 850 MHz band of −4 dBi, which is as good as an 850 MHz development on PIFA structure; a toroidal radiation pattern with only limited distortion in the vertical plane by being in the close vicinity of the laptop. There is a trade-off due to the folding of the radiation element 5, 6, but by keeping the operational position within 10 deviation the input impedance can be maintained at approximately 30 Ω.

In the operational position, the pivot axis 9 is 2 to 3 mm separated from the edge of the telecommunications device 1 (which has a slightly extended design compared to the form factor of a PC Card PCMCIA Type II.) The obtained displacement is an extra measure to reduce the influence of the host device (laptop) as being virtual ground.

The invention claimed is:

1. Retractable antenna structure for use in a telecommunications device, the antenna structure comprising a slide portion adapted for movably mounting the antenna structure in a cavity of a telecommunications device, such that the antenna structure is retractable into the cavity for storage and extensible from the cavity for operation, and an antenna portion carrying a flat radiation element for establishing at least one wireless network connection, wherein the antenna portion comprises a first wing carrying a first part of the flat radiation element and a second wing carrying a second part of the flat radiation element, the wings being pivotally connected to each other between a storage position in which the wings lie on top of each other and an operational position in which the wings are spaced apart and are non-coplanar, wherein the antenna portion further comprises at least one resilient member acting on at least one of the wings for spacing the wings apart and wherein the first and second parts of the flat radiation element have radiation patterns of predetermined shapes adapted to obtain a dipole-like operation in the non-coplanar operational position.

2. Retractable antenna structure according to claim 1, wherein in the operational position the second wing is coplanar with the slide portion while the first wing is erected with respect to the second wing to a predetermined separation angle between 30° and 85°.

3. Retractable antenna structure according to claim 1, wherein in the operational position the second wing is coplanar with the slide portion while the first wing is erected with respect to the second wing to a predetermined separation angle between 60° and 80°.

4. Retractable antenna structure according to claim 1, wherein in the operational position the second wing is coplanar with the slide portion while the first wing is erected with respect to the second wing to a predetermined separation angle of 70°.

5. Retractable antenna structure according to claim 1, wherein the first and second parts of the flat radiation element are each formed by a conductive pattern on a thin film or PCB.

6. Retractable antenna structure according to claim 5, wherein the conductive pattern of the first part of the flat radiation element comprises components adapted for radiating in at least one frequency band of a wireless network and that the conductive pattern of the second part of the flat radiation element comprises components adapted for conducting a counterpoise current.

7. Retractable antenna structure according to claim 5, wherein the radiation patterns have components which are tuned for one or more of the following frequency bands: GSM850 (824-894 MHz), EGSM900 (880-960 MHz), DCS1800 (1710-1880 MHz), PCS1900 (1850-1990 MHz), UMTS2100 (1920-2170 MHz).

8. Retractable antenna structure according to claim 1, wherein the slide portion of the antenna structure is provided with one or more resilient contacts in electrical communication with the first and/or second parts of the flat radiation element for contacting a corresponding contact on the telecommunications device.

9. Retractable antenna structure according to claim 1, wherein the first and second wings are pivotally connected to the slide portion along a common pivot axis.

10. Retractable antenna structure according to claim 9, wherein the second wing is movable in downward direction against the action of the at least one resilient member which acts on the first wing.

11. Retractable antenna structure according to claim 9, wherein the second wing is movable in downward direction against the action of a separate resilient member.

12. Retractable antenna structure according to claim 1, wherein the slide portion is provided with a snap-fitting locking member for releasably locking the antenna structure to a corresponding locking member provided within the cavity of the telecommunications device.

13. Telecommunications device comprising a cavity and a retractable antenna structure which is movably mounted in said cavity, such that the antenna structure is retractable into the cavity for storage and extensible from the cavity for operation, wherein the antenna structure comprises a slide portion adapted for movably mounting the antenna structure in a cavity of a telecommunications device, such that the antenna structure is retractable into the cavity for storage and extensible from the cavity for operation, and an antenna portion carrying a flat radiation element for establishing at least one wireless network connection, wherein the antenna portion comprises a first wing carrying a first part of the radiation element and a second wing carrying a second part of the radiation element, the wings being pivotally connected to each other between a storage position in which the wings lie on top of each other and an operational position in which the wings are spaced apart and are non-coplanar, wherein the antenna portion further comprises at least one resilient member acting on at least one of the wings for spacing the wings apart and wherein the first and second parts of the flat radiation element have radiation patterns of predetermined shapes adapted to obtain a dipole-like operation in the non-coplanar operational position.

14. Telecommunications device according to claim 13, wherein the slide portion is provided with a snap-fitting locking member for releasably locking the antenna structure to a corresponding locking member provided within the cavity of the telecommunications device, the snap-fitting locking member being accessible to the user through an opening in the housing of the device for releasing the antenna structure.

15. Telecommunications device according to claim 13, wherein the telecommunications device is a PCMCIA telecommunications card for establishing wireless communication between a host device and one or more wireless networks.

16. Telecommunications device according to claim 13, wherein the telecommunications device is a laptop computer.

17. Telecommunications device according to claim 16, wherein the laptop computer comprises a computer part and a display part which are hingedly attached to each other, the cavity with the retractable antenna structure being located on the display part.

* * * * *